United States Patent Office 3,748,274
Patented July 24, 1973

3,748,274
METHOD OF MAKING PARTICLES FROM
AN AQUEOUS SOL
Gordon W. Rankin and James R. Hooker, San Diego, Calif., assignors to the United States of America as represented by the United States Atomic Energy Commission
No Drawing. Filed Aug. 29, 1969, Ser. No. 854,287
Int. Cl. C09k 3/08
U.S. Cl. 252—301.1 S    6 Claims

ABSTRACT OF THE DISCLOSURE

A process for preparing gel particles from an aqueous sol by forming the sol into droplets in a liquid system wherein the liquid phase contains a liquid organic solvent and a barrier agent. The barrier agent prevents dehydration from occurring too rapidly and permits surface tension effects to form sol droplets into the desired spheroidal shape. A preferred barrier agent is mineral oil.

---

The present invention relates generally to a process for producing spherical particles and more particularly relates to a process for producing spherical particles of nuclear fuel material by drying aqueous sols.

Particulate nuclear fuel has commonly been made by the so-called "sol-gel" process, wherein a fertile and/or fissionable material is prepared in the form of an aqueous sol, and the sol is dehydrated or otherwise treated under controlled conditions to produce gel particles, which are then sintered to a high density. The sol-gel process is advantageous because of its inherent simplicity and its capability for controlling the size and shape of particles produced thereby.

The sol-gel process, however, was initially developed for the preparation of irregularly shaped metal oxide fragments which were fabricated by compacting the fragments into a fuel body. The fragments were formed when the gel cracked upon drying. However, for current reactor designs, especially the design of high-temperature, gas-cooled reactors, it is desirable to produce the gel particles in a spheroidal shape which is retained during drying and subsequent sintering. Such spheroidal shapes are more easily coated with a suitable coating material, such as pyrolytic carbon. Coated nuclear fuel particles are desirable in that each particle acts as a miniature pressure vessel and the fission products are retained within the particle.

The methods heretofore employed for providing fuel materials in the form of spheroidal particles, however, have not proven completely satisfactory in that a uniform spherical shape and a uniform range of particle sizes is not always attained. Also, some of the particles obtained after sintering the gel particles have surface irregularities, such as pits, cavities and cracks.

A process for producing fuel material in spheroidal particle form from a sol is known wherein the sol is dispersed in the form of small droplets in a dehydrating liquid. The droplets attain a spheroidal shape due to surface tension effects, which spheroidal shape is retained during drying of the sol droplets to form gel particles. However, difficulties have been encountered with this system. The process requires a high degree of control in order to prevent fragmentation of the droplets during drying and to prevent coalesence of the sol droplets to form particles of an undesired large size. Furthermore, some of the gel particles produced are found to have surface irregularities such as pits, cavities and cracks.

Accordingly, it is an object of the invention to provide spheroidal particles from sols which have a high degree of uniformity of shape and which are free of internal or surface defects and a method for making such particles.

It is another object of the invention to provide a method for producing spheroidal particles from sols having a high degree of uniformity of shape and surface characteristics by a method allowing the use of a wide range of dehydrating liquids.

It is a further object of the invention to provide spheroidal particles from metal oxide sols by the dehydration of sol droplets in a solvent wherein the rate of dehydration is controlled.

These and other objects of the invention will become more apparent from the following detailed description and claims.

In accordance with the invention, spherical gel particles are prepared from an aqueous sol by forming the sol into droplets of a predetermined size in a liquid system wherein the liquid phase contains a liquid organic solvent and a barrier agent.

Several features are important in a process for preparing spheroidal gel particles from sols. The properties of the drying medium into which the sol is dispersed must be such as to allow both the formation of spherical droplets and removal of water from the droplets. In this connection, the rate of drying of the sol droplets should be such as to permit the sol droplets to become equalized in the medium so that surface tension of the droplets results in the formation of spherically shaped droplets. In the liquid system of the invention the liquid organic solvent acts as a dehydration agent to congeal the sol droplets into gel particles, while the barrier agent prevents dehydration from occurring too rapidly and permits surface tension effects to form the sol droplets into the desired spheroidal shape. Gel particles prepared by this process are smooth and uniform in shape, and upon being sintered they exhibit high density and mechanical strength. The method of the invention may be operated batch-wise or continuously.

The improved method of the invention is particularly suitable for preparing spherical particles of fertile and/or fissionable fuel materials. Particular materials suitable for preparing sols for use in the improved method include actinide metal oxides, mixtures of these oxides, solid solution systems of actinide metal oxides or other ceramic oxides, referred to hereinafter as metal oxides. The actinide metals include the elements in the actinide series in the periodic table, thorium, uranium, plutonium, etc. The method of the invention is, however, also suitable for preparing spherical particles from various other colloidal materials which are capable of forming sols. For example, the colloids of alumina, zirconia, beryllia, silica, magnesia, chromia, the refractory oxides of metals in Group IV of the period table, transition element oxides, rare earth oxides and their mixtures may be prepared into sols.

The sols used for the preparation of spheroidal particles may be prepared by any known process. Suitable sols and the process for making such sols are well known in the art. In general, sols useful in the invention contain from about 1 to about 9 percent by weight of solid material with the balance consisting of a liquid or mixture of liquid. The chemical composition of the sol is not critical except to the extent that it influences the stability of the sol. The process of the invention may be adapted to the preparation of carbides by incorporating carbon in the sol. In this connection, when colloidal carbon is dispersed in the sol in addition to the metal oxide, a metal carbide is preferentially obtained during sintering in an inert atmosphere. The carbon should be present at a level at least stoichiometrically equivalent to the metal oxide and is preferably present in excess of the stoichiometric amount of carbon required.

Using the improved process provided by the invention, liquid organic solvents may be used having a water extraction capability (as measured by the solubility of the water in liquid organic solvent) within a fairly wide range while still obtaining the formation of spherical gel particles by gradual removal of water from the sol droplets. The solubility of water in the liquid organic solvent should, however, be at least about 3 volume percent to provide suitable yields and rates of production. Liquid organic solvents having higher water solubilities within the range of from about 10 to about 30 volume percent may be used and are preferred. As will be explained more fully hereinafter, the level of barrier agent that is used in the practice of the invention is related to the solubility of water in the liquid organic solvent. As liquid organic solvents having higher water solubilities are used, the level of barrier agent is increased.

The liquid organic solvent should have an interfacial tension with water of between about 10 dynes per square centimeter and about 40 dynes per square centimeter to permit formation of suitably sized particles. In this connection, the method of the invention may be used to prepare spherical gel particles having a particle size of between about 30 microns and about 125 microns in diameter. It is desirable to be able to remove water which has been extracted from the sol from the organic solvent by distillation or other means. Therefore, it is also preferred that the liquid organic solvent be chemically stable during distillation of the water which is extracted from the aqueous sol. In general, most organic solvents having a water solubility of at least about 3 volume percent may be used. Suitable liquid organic solvents include primary alcohols having four to eight carbon atoms, such as butanol, 2-ethylhexanol and 2-methylpentanol, and esters of carboxylic acids, such as 2-ethylhexyl acetate and ethylbenzoate.

The barrier agent of the invention acts to slow and control the extraction of water from the sol and to provide sufficient time for the sol droplets to become spheroidized in the liquid organic solvent before the sol droplets are congealed into a gel. In this connection, it is preferred that the rate of water extraction should be such that not more than about 25 percent by weight of the water present in the sol is extracted during the first 0.5 minutes that the sol is present in the liquid organic solvent. Thereafter, the rate of water extraction is not critical. It will be apparent, however, that the barrier agent will slow extraction of water even after the initial critical period. Therefore, so as not to unduly prolong the extraction step, it is also preferred that the rate of water extraction be sufficient to extract at least about 90 percent by weight of the water present in the sol during the first 10 minutes that the sol is present in the liquid organic solvent. The level of barrier agent may be readily adjusted to provide a rate of water extraction within the preferred range set forth above. In general, a level of barrier agent of from about 5 percent to about 40 percent will provide the desired rate of water extraction with moist organic liquid solvents.

While not wishing to be bound by any theory, it is believed that the barrier agent of the invention forms an interfacial barrier between the sol droplets and the liquid organic solvent. The thickness of the interfacial barrier determines the rate of extraction of water from the sol and determines the amount of the barrier agent which is required. With liquid organic solvents having relatively high water solubilities, higher levels of the barrier agent are required to provide a thicker interfacial barrier. For example, with butanol, which has a solubility for water at 90° C. of about 28 weight percent, a level of barrier agent of from about 10 percent to about 40 percent by volume of butanol is used. In contrast, with ethylhexanol, which has a solubility for water at 90° C. of from about four to six weight percent, a level of barrier agent of from about 5 percent to about 20 percent by volume of the ethylhexanol is used. The barrier agent of the invention should be substantially immiscible with water and should have a solubility for water of less than about 0.1 volume percent. Suitable barrier agents are non-polar organic compounds which meet the above-stated requirements. The barrier agent may be selected from straight, branched chain or cyclic hydrocarbon compounds, including alkanes, alcohols, esters and ethers. A preferred group of barrier agents are selected from petroleum, plant and animal oils. A preferred group of petroleum oils are those referred to as mineral oils. Petroleum oils occur in straight and branched chains (paraffins), single or multiple saturated rings (cycloparaffins or naphthenes) and in cyclic structures of the aromatic type such as benzene, napthalene and phenanthrene. The cyclic structures may have attached to them side chains of paraffinic structure. In petroleum oils which have been produced by cracking in a refinery, olefins or compounds with carbon-carbon double bonds not in aromatic rings, are also found. Plant and animal oils usually occur in triglyceride form, and may have side chains of from two to twenty carbons.

The barrier agent should be soluble in the liquid organic solvent at the temperature at which the dehydration of the sol is effected. It should be understood that barrier agents having melting points at temperatures above ambient may be used, so long as the barrier agent is soluble in the liquid organic solvent at the temperature at which dehydration of the sol is effected. In this connection, a dehydration temperature of from about 80° C. to about 100° C. is preferred. For most liquid organic solvents at dehydration temperatures below about 60° C., agglomeration of the sol droplets may occur during the dehydration. At temperatures above about 100° C. the drying rate may be too rapid even with the barrier agent of the invention, and deformed gel particles may be obtained.

The following examples further illustrate various features of the present invention, but are intended to in no way limit the invention, which is defined in the appended claims.

EXAMPLE I

A dehydrating vat, having a surface area of 1.5 square feet, is filled to a depth of 1.5 feet with ethylhexanol. The ethylhexanol contains 10 percent by volume of a petroleum oil. The petroleum oil has a solubility for water of less than 0.1 volume percent. The petroleum oil is obtained by refining crude petroleum and is from the group designated as mineral oils. The petroleum oil has a viscosity designation of 1–20 poises.

The ethylhexanol-petroleum oil mixture is heated to a temperature of 90° C. Thereafter, an aqueous sol is dispersed in the form of droplets onto the surface of the dehydrating vat, and the sol droplets are allowed to settle. The sol contains 30 weight percent of metals (actinide+carbon). The sol is dispersed onto the surface of the vat at a rate of about 10 ml. per min. The rate of addition of the sol droplets to the surface of the dehydrating vat is such that evaporation of moisture from the vat is sufficient to permit continuous addition of the sol to the vat.

The sol droplets are gradually dehydrated as they settle through the dehydrating vat. Dehydration is complete when the particles reach the bottom of the vat, which requires from about 60 to about 120 seconds. The dehydrated gel particles are collected from a screen at various intervals during the run. The gel particles are then sintered in an inert atmosphere at a temperature of about 1700° C. to provide a microsphere product. The product, when examined under a microscope, is found to consist of spherical particles ranging from 30 to 125 microns. The surface of the particle is smooth, and the particles are not found to be fractured or to have surface defects, such as pits or cracks.

The run is repeated without using the petroleum oil in the dehydrating vat. When the product is examined under the microscope, the particles are found to contain many split spheres and surface defects. Such particles obviously lack strength and have low particle density. The use of the barrier agent of the invention is therefore seen to produce an improved product.

EXAMPLE II

The method of Example I is used to produce additional particles, with the exception that a liquid organic solvent having a higher solubility for water than ethylhexanol is used. A dehydration vat is prepared as in Example I containing butanol as the liquid organic solvent. Since the water absorption capacity of butanol is 28 volume percent which is greater than that of ethylhexanol, 20 volume percent of the petroleum oil of Example I is used.

The dehydration vat is heated to a temperature of 90° C. and sol droplets are dispersed onto the surface of the vat. Spherical gel particles are recovered periodically from the bottom of the vat after the sol droplets have settled. The spherical particles are extremely uniform in shape, and no surface defects are observed.

When the run is repeated without the addition of petroleum oil to the dehydration vat, the gel particles are found to be badly fractured and to contain many surface defects.

EXAMPLE III

An 8 foot high column is used to continuously prepare spherical gel particles by the method of the invention. An ethylhexanol liquid organic solvent, containing 10 volume percent petroleum oil, as described in Example I, is introduced into the bottom of the column and flows upwardly therethrough. An aqueous sol, as described in Example I, is injected into the top of the column, and settles gradually through the column and is removed from the bottom. The temperature of the entering liquid organic solvent is 90° C. The sol is introduced into the top of the column at a rate of 10 milliliters per minute. The sol contains 30 weight percent of metals (actinide+carbon). The sol is introduced through an injection tube consisting of a 22 gauge hypodermic needle. The sol droplets are undisturbed as they move downwardly through the column to a collection point at the bottom from which gel particles are recovered. The gel particles are sintered in an inert atmosphere at a temperature of about 1700° C. to provide a microsphere product. When examined under a microscope, the product is found to consist of uniform spherical particles ranging from 30 to 125 microns. The surface of the particles is smooth, and there is no indication of fracturing or surface defects in the particles.

The above run is repeated without the use of petroleum oil in the liquid organic solvent. The gel particles obtained in this run have numerous split and fragmented particles and surface defects are apparent.

From these examples, it can be seen that the use of a barrier agent in combination with a liquid organic solvent provides a method for producing uniform spherical gel particles.

What is claimed is:

1. A process for preparing spheroidal particles by dehydration of an aqueous sol comprising providing an aqueous sol of a metal oxide, providing a liquid organic dehydrating agent having a barrier agent dissolved therein, said barrier agent being substantially immiscible with said sol and being present in an amount where it is substantially entirely dissolved in said liquid organic dehydrating agent at the temperature of the process, dispersing droplets of said aqueous sol in said organic dehydrating agent and maintaining contact between said aqueous sol and said organic dehydrating agent for a sufficient time to dehydrate said aqueous sol droplets to an extent that gel spheroids are formed, said barrier agent limiting the extraction of water from said sol droplets to less than about 25 percent by weight of the water present in the sol during the first 0.5 minute that said sol droplet is present in said organic dehydrating agent.

2. A process in accordance with claim 1 wherein said liquid organic dehydrating agent has a solubility for water between about 3 volume percent and about 30 volume percent.

3. A process in accordance with claim 1 wherein said barrier agent is a petroleum, plant or animal oil or a mixture thereof.

4. A process in accordance with claim 1 in which said barrier agent is mineral oil.

5. A process in accordance with claim 1 wherein said liquid organic dehydrating agent is maintained at a temperature of between about 65° C. and about 100° C. during said dehydration of said aqueous sol droplets.

6. A process in accordance with claim 1 wherein said gel spheroids are between about 30 microns and about 125 microns in diameter.

References Cited

UNITED STATES PATENTS

| 3,151,085 | 9/1964 | Smith et al. | 252—301.1 |
| 3,290,122 | 12/1966 | Clinton et al. | 23—345 X |
| 3,329,745 | 7/1967 | Grange | 252—301.1 X |
| 3,331,898 | 7/1967 | Haas et al. | 252—301.1 X |
| 3,384,687 | 5/1968 | Flack et al. | 252—301.1 X |

FOREIGN PATENTS

| 904,679 | 8/1962 | Great Britain | 252—301.1 |
| 1,032,105 | 6/1966 | Great Britain | 252—301.1 |

CARL D. QUARFORTH, Primary Examiner

E. E. LEHMANN, Assistant Examiner

U.S. Cl. X.R.

23—339, 345